(12) United States Patent
Ma

(10) Patent No.: US 7,435,117 B2
(45) Date of Patent: Oct. 14, 2008

(54) CARD CONNECTOR

(75) Inventor: Wen-Qiang Ma, ShenZhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/811,745

(22) Filed: Jun. 12, 2007

(65) Prior Publication Data

US 2007/0287335 A1    Dec. 13, 2007

(30) Foreign Application Priority Data

Jun. 12, 2006   (CN)   .................... 2006 2 0073760 U

(51) Int. Cl.
    *H01R 29/00* (2006.01)
(52) U.S. Cl. ...................... 439/188; 439/630; 439/733.1
(58) Field of Classification Search ................ 439/188, 439/489, 630, 733.1; 200/50.09, 50.1, 51
    See application file for complete search history.

(56) References Cited

U.S. PATENT DOCUMENTS

| 4,070,557 | A  | * | 1/1978  | Ostapovitch | ............... 200/51.1 |
| 6,086,426 | A  | * | 7/2000  | Chang       | ....................... 439/630 |
| 6,382,994 | B1 | * | 5/2002  | Chang       | ....................... 439/157 |
| 6,719,577 | B2 | * | 4/2004  | Nogami      | ....................... 439/188 |
| 6,749,450 | B1 | * | 6/2004  | Chen        | ....................... 439/188 |
| 6,761,572 | B1 | * | 7/2004  | Chou        | ....................... 439/188 |
| 6,805,566 | B2 | * | 10/2004 | Chia-Chen   | ................. 439/188 |
| 6,899,557 | B2 | * | 5/2005  | Hirata      | ....................... 439/188 |
| 7,261,578 | B2 | * | 8/2007  | Zhao        | ....................... 439/188 |
| 2006/0079106 | A1 | * | 4/2006 | Kikuchi    | ...................... 439/188 |

* cited by examiner

*Primary Examiner*—Hien Vu
(74) *Attorney, Agent, or Firm*—Wei Te Chung

(57) ABSTRACT

A card connector comprises an insulative housing having a rear contact-mounting section at the rear of the cavity, a longitudinal side wall section extends forwardly from one end of the rear section at one side of the cavity, a bottom surface for mounting on a circuit board, a plurality of contacts are mounted on the rear contact-mounting section of the housing and have contact portions for engaging appropriate contacts on the memory card. The sidewalls and the bottom surface cooperatively form an interior cavity for receiving a memory card. A pair of switch contacts is mounted on the sidewall section of the housing; one of the sidewalls defines a pair of retaining recess for receiving the switch contacts. At least one switch contact defines a number of dimples for engaging with inner walls of the corresponding retaining recess.

5 Claims, 3 Drawing Sheets

CARD CONNECTOR

BACKGROUND OF THE INVENTION

1. Field of the Invention

This invention generally relates to the art of electrical connectors and, particularly to a memory card connector able to prevent a card inserted therein from sliding off.

2. Background of the Invention

Memory cards are known in the art and contain intelligence in the form of a memory circuit or other electronic program. Some form of card reader reads the information or memory stored on the card. Such cards are used in many applications in today's electronic society, including video cameras, digital still cameras, smartphones, PDA's, music players, ATMs, cable television decoders, toys, games, PC adapters, multimedia cards and other electronic applications. Typically, a memory card includes a contact or contact array for connection through a card connector to a card reader system and then to external equipment. The connector readily accommodates insertion and removal of the card to provide quick access to the information and program on the card. The card connector includes contacts for yieldingly engaging the contact array of the card.

Referring to FIG. 3, a memory card connector 8 comprises a housing 80, a plurality of contacts 90 received in the housing 80, a securing member 50 anchored in the housing 80, a pair of retention plate 70 inserted in housing 80, and a pair of switch contacts arranged in the housing 80. The housing 80 defines a bottom wall 800, a sidewall 801, a receiving space cooperatively formed by the bottom wall 800 and the sidewall 801. The switch contacts comprise a first switch 61 contact and a second switch contact 62. The first contact 61 received in a rear end the housing 80 and extends inwardly in a lengthwise direction of the housing 80, the second switch contact 62 received in a front end of the housing 80 and extends towards the rear end of the housing 80 for engaging with the first switch contact 61. The first switch contact 61 is disposed above the second switch contact 62 and vertical to the second switch contact 62. In assembly, the memory card is inserted into the housing 80, the first switch contact 61 is pressed downwardly for electrically connecting with the second switch contact 62, so the card is electrically connected with the other electrical component.

Unfortunately, problems continue to be encountered with memory card connectors which have a first contact disposed in a rear end of the housing. When the memory card is inserted into the housing, the first switch will exert a force, which can push the card rearward thereby leading the circuit open between the card and the other component. The present invention is directed to solving these problems.

SUMMARY OF THE INVENTION

An object, therefore, of the invention is to provide a new and improved memory card connector of the character described able to prevent the card therein from escaping from the connector.

In the exemplary embodiment of the invention, a card connector comprises an insulative housing having a rear contact-mounting section at the rear of the cavity, a longitudinal side wall section extends forwardly from one end of the rear section at one side of the cavity, a bottom surface for mounting on a circuit board, a plurality of contacts are mounted on the rear contact-mounting section of the housing and have contact portions for engaging appropriate contacts on the memory card. The sidewalls and the bottom surface cooperatively form an interior cavity for receiving a memory card. A pair of switch contacts is mounted on the sidewall section of the housing; one of the sidewalls defines a pair of retaining recess for receiving the switch contacts. At least one switch contact defines a number of dimples for engaging with inner walls of the corresponding retaining recess.

As disclosed herein, both switch contacts engage in the side walls of the housing. And at least one of the switch contacts defines a number of dimples engaging with the inner walls of the corresponding recess, which provides a securing engagement between the switch contact and the hosing. In addition, the design of the switch contacts received in the sidewalls of the housing prevents the card received therein from sliding form the housing.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
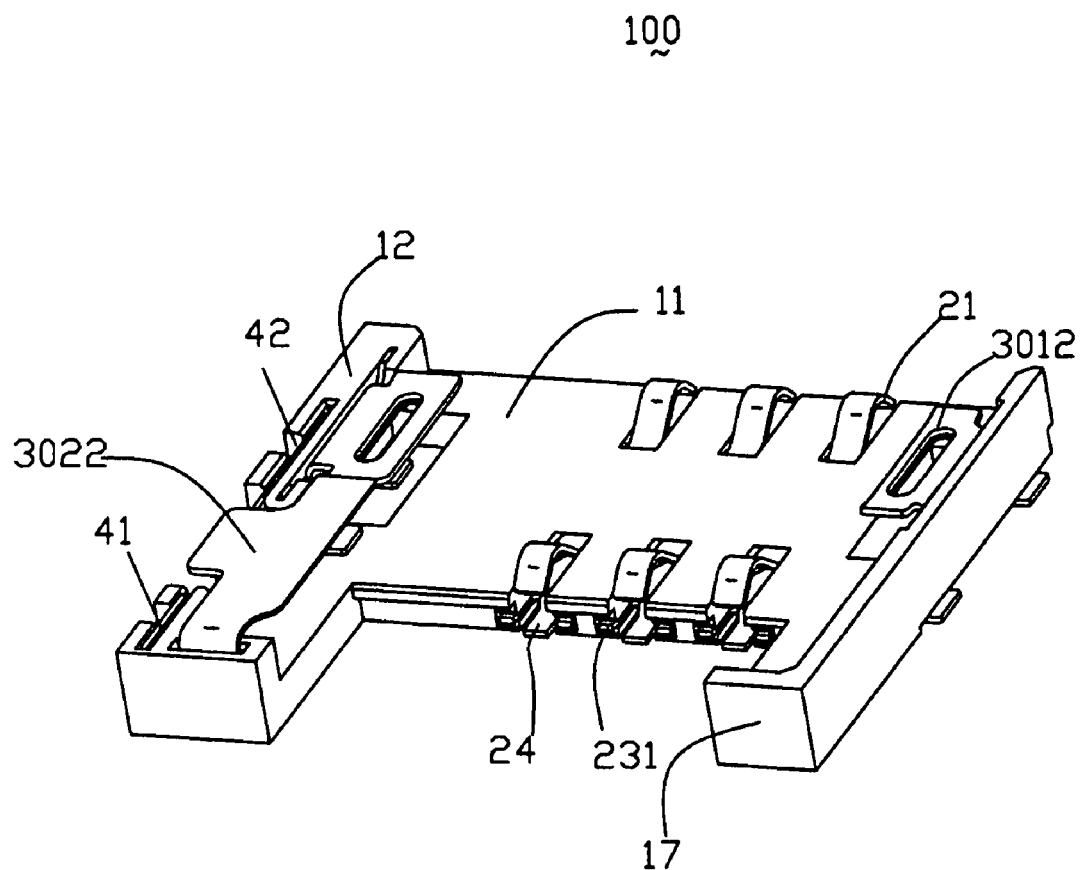
FIG. 1 is an assembled perspective view of a card connector embodying the concepts of the invention.
Figure 2:
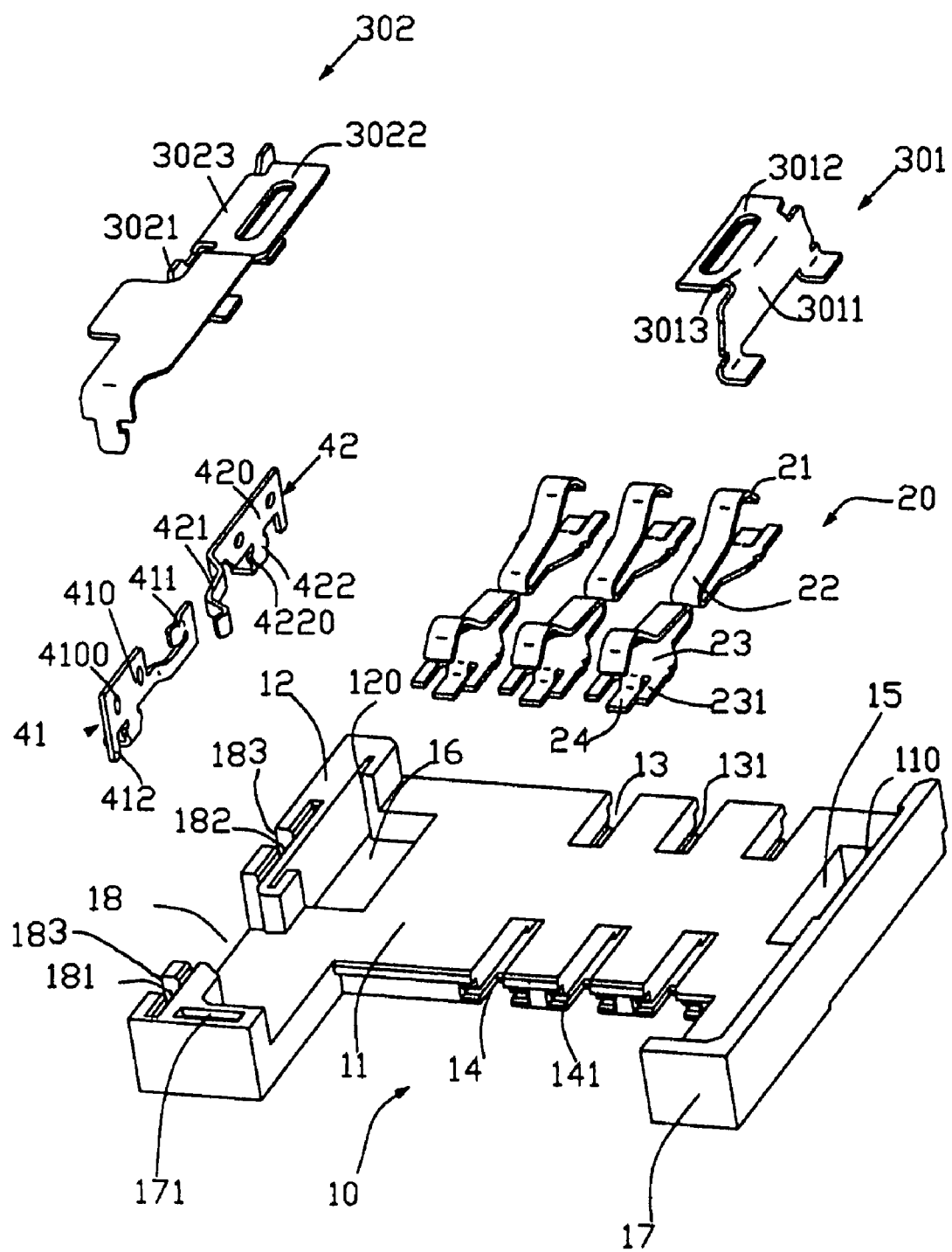
FIG. 2 is an exploded view of the connector shown in FIG. 1.
Figure 3:
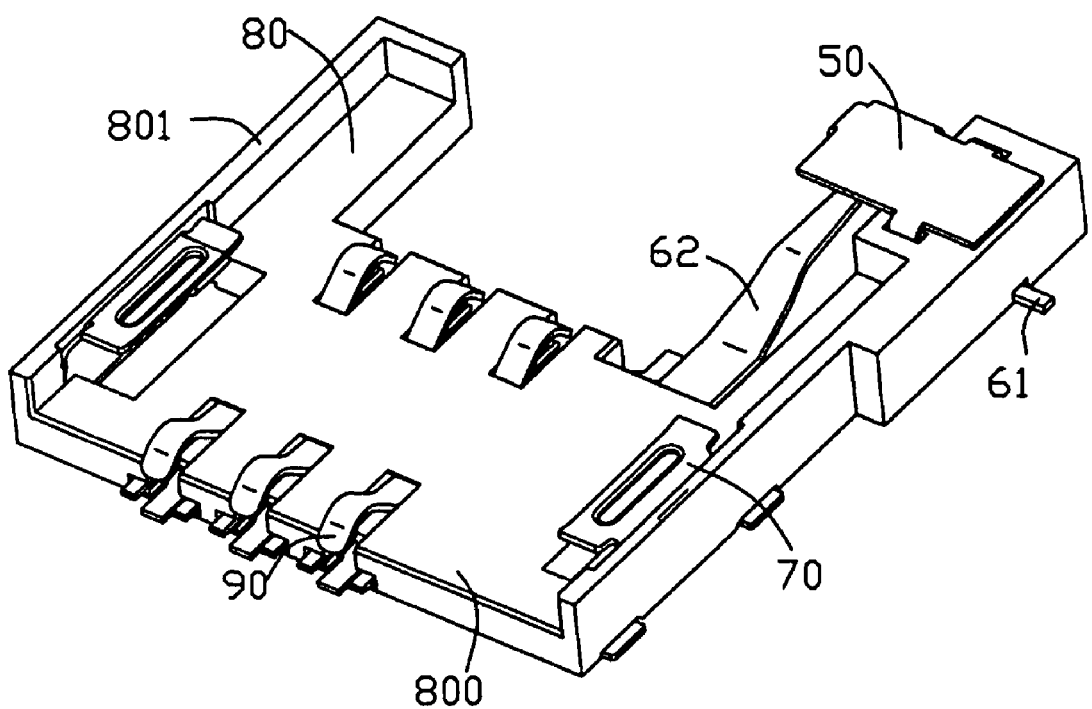
FIG. 3 is an exploded view of a related connector.

Referring to FIGS. 1-2 in greater detail, the invention is embodied in a card connector generally designated 100, which, includes a housing, generally designated 10, and a securing member, along with a plurality of contacts, generally designated 301,302, mounted on the housing. The housing 10 is fabricated of insulating material such as molded plastic, and the securing member is fabricated of metal such as stamped and formed sheet metal material and comprises a first securing member 301 and second securing member 302, a first switch contact 41 and a second switch contact 42 received in the housing 10.

The housing 10 comprises a body portion 11, a first receiving slot 13 and a second receiving slot 14 disposed in the body portion 11, a front wall 17 and a pair of sidewalls 12 upwardly extending from the body portion 11 combining to form an interior card-receiving cavity having an open mouth at a front receptacle area of the connector. The mouth permits insertion and removal of a memory card into and out of cavity. The first receiving slot 13 and the second receiving slot 14 symmetrically arranged in two sides of the body portion 11 define an indented concave 131, 141 respectively. In addition, the body portion 11 defines a first concave 15 and a second concave 16 adjacent to the sidewalls 12 define a first recess 110 in corresponding to the first concave 15 for receiving the first securing plate 301 and a second recess 120 in corresponding to the second concave 16 for receiving the second plate 302. The housing 10 defines a transverse opening 18 in one of the sidewalls 12, and a first anchoring recess 181 and, a second anchoring recess 182 indented in an upper surface of the sidewall 12a arranged in two sides of the opening 18. Each of the recess 181 is equipped with a latetally extending opening 183 so as to commonly form a T-shaped configuration in a top view. A position recess 171 is indented in an upper surface of the front wall 17.

Contacts 20 are mounted within a plurality of through passages of the housing. Each contact 20 includes a retention portion 23, a contacting portion for engaging with the card, a tail portion 24 generally extending downwardly from the retention portion 23, a pair of inserting portion 231 arranged two sides of the tail portion, a curved portion 22 for connecting the tail portion 24 with retention portion 23. When the contacts 20 are inserted into the housing 10, the retention portion 23 are received into the first recess 13 and the second recess 14 and the inserting portions 231 are inserted into the indented concave 131, 141 of the housing 10 for making a stable engagement between the contacts 20 and the housing 10.

The securing member comprises a first securing plate 301 and a second securing plate 302. The first securing plate 301 comprises a first securing portion 3011, a first horizontal portion 3012, a first connecting portion 3013 connecting the first securing portion 3011 and the first horizontal portion 3012. The second securing plate 302 comprises a second securing portion 3021, a second horizontal portion 3022, a second connecting portion 3023 connecting the securing second portion 3021 and the horizontal second portion 3022. The second horizontal portion 3022 extends almost a full dimension of the housing along a front-to-back direction. The first securing plate 301 is securely positioned in the first recess 110 and the second securing plate 302 is securely positioned in the second recess 120 and the positioning recess 171.

The switch contact comprises a first switch contact 41 received in the first anchoring recess 181 and a second switch contact 42 received in the second anchoring reeess 182. The first switch contact 41 and the second switch contact 42 define a first base portion 410 and a second base portion 420 respectively, and a first elastic portion 411 extending from the first base portion 410 to the transverse opening 18 and towards the receiving space and a second elastic portion 421 extending from the second base portion 420 to the transverse opening 18 and towards the receiving space. The first elastic portion 411 is overlapped with the second elastic portion 421 in a vertical direction. The first base portion 410 and the second base portion 420 extend downwardly a locating portion 412 and a securing means 422. The locating portion 412 is defined on lateral sides of the first base portion 410 and the second base portion 420 respectively for preventing the switch contact 41 and the second switch contact 42 from rotating or sliding. The securing means 422 defines a number of barbs 4220 on two sides thereof for engaging with the first anchoring recess 181 and the second anchoring recess 182 to attain a stable engagement between the switch contacts 41, 42 and the housing 10. In addition, the securing means 422 further defines a vertical solder portion for engaging with a printed circuit board. The first and second base portion 410, 420 define a plurality of deformable projection 4100 for abutting the sidewalls 12 of the housing 10 for enforcing the engaging force between the first elastic portion 411 and the second elastic portion 412.

In use, the first switch contact 41 and the second switch contact 42 are abutting against the inner walls 12 of the housing 10, the card pushes the second elastic portion 421 to engage with the first elastic portion 411, hence the electrical card connector 100 attains an operating state. For second elastic portion 421 engages with sides of the card, the phenomenon of the card sliding from the housing 10 can be avoided.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

While preferred embodiment in accordance with the present invention have been shown and described, equivalent modifications and changes known to persons skilled in the art according to the spirit of the present invention are considered within the scope of the present invention as defined in the appended claims.

What is claimed is:

1. An electrical card connector comprising:
an insulative housing defining a horizontal base with two opposite side walls and a front wall extending upward on three sides thereof;
first and second concaves formed in an inner side of each of said side walls and extending through said base in a vertical direction;
a first securing member upwardly assembled from a bottom face of the housing and into the first concave, said first securing member including an upper horizontal portion which is dimensioned smaller, in a top view, than the first concave and spaced from an upper face of the base with a distance for receiving a card therebetween, and at least a solder pad located right below the first said arm, and
a second securing member downwardly assembled into the second concave from the upper face of the base, said second securing member including an upper horizontal section which is dimensioned larger, in the top view, than the second concave, at least a solder pad located in a bottom portion of the second concave;
a switch contact downwardly inserted into a recess on a top surface of one of the sidewalls, said switch contact including a base portion with at least one dimple thereon received in the recess for reinforcement, and a spring contact section extending from the base portion and exposed to the exterior of the top surface for engagement with another switch contact, a securing device having a horizontal solder pad downwardly passing through a laterally extending opening of the recess during assembling until reach a position coplanar with a bottom face of the housing, and a locating portion extending from a lateral side of the switch contact downwardly and received in the recess.

2. The electrical card connector as claimed in claim 1, wherein said second securing member further includes a horizontal securing section to hold the second securing member in position in the housing.

3. The electrical card connector as claimed in claim 2, wherein said second securing member extends almost a full dimension of the housing along a front-to-back direction.

4. The electrical card connector as claimed in claim 1, wherein said second securing member has a free end securely positioned in a positioning recess of the front wall.

5. An electrical card connector comprising:
a housing comprising a body portion, a front wall and at least one side wall extending from the sides of the body portion forming a card receiving space;
a number of contacts received in the housing;
a securing member attached on the housing;
wherein the housing having a transverse opening in the side wall, and a first anchoring recess receiving a first switch contact and a second anchoring recess receiving a second switch contact indented in an upper surface of the side wall and arranged in two sides of the opening; at least one of the switch contact having a surface mount securing means with a number of barbs on two sides thereof and a locating portion spaced from the securing means; the first switch contact and the second switch contact respectively having a first and second elastic portion extending to the transverse opening and towards the receiving space and separated from each other without a card inserted; and the two elastic portion contact with each other when said card is inserted;

wherein the contact comprises a base portion, a contacting portion extending from an upper portion of the base portion, and a tail portion extending from a lower portion of the base portion;

wherein the contacting portion and the tail portion respectively define a bending portion with rectangular shape on a distal end thereof.

* * * * *